Figure 1:
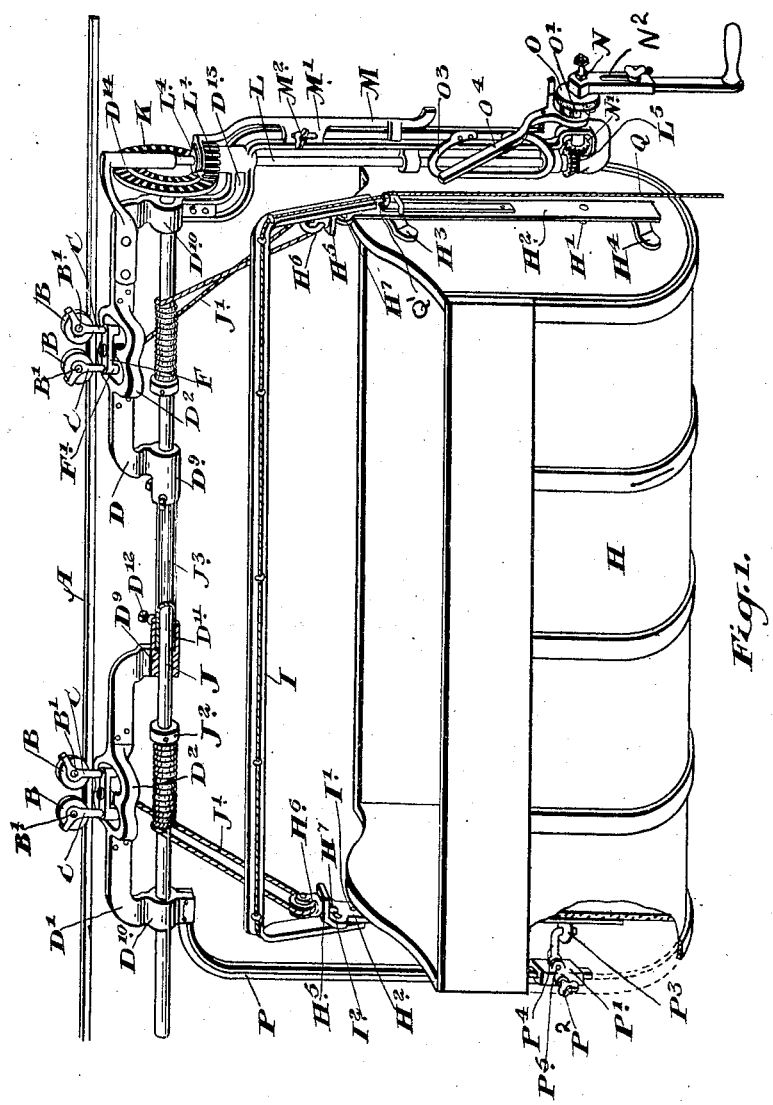

No. 827,842. PATENTED AUG. 7, 1906.
W. D. BEATH.
FEED AND LITTER CARRIER.
APPLICATION FILED JULY 1, 1905.

2 SHEETS—SHEET 1.

Witnesses
Edgar Sheppard
N. Lawless

Inventor
William Dick Beath
by
Fred D. Fahnestock
Atty.

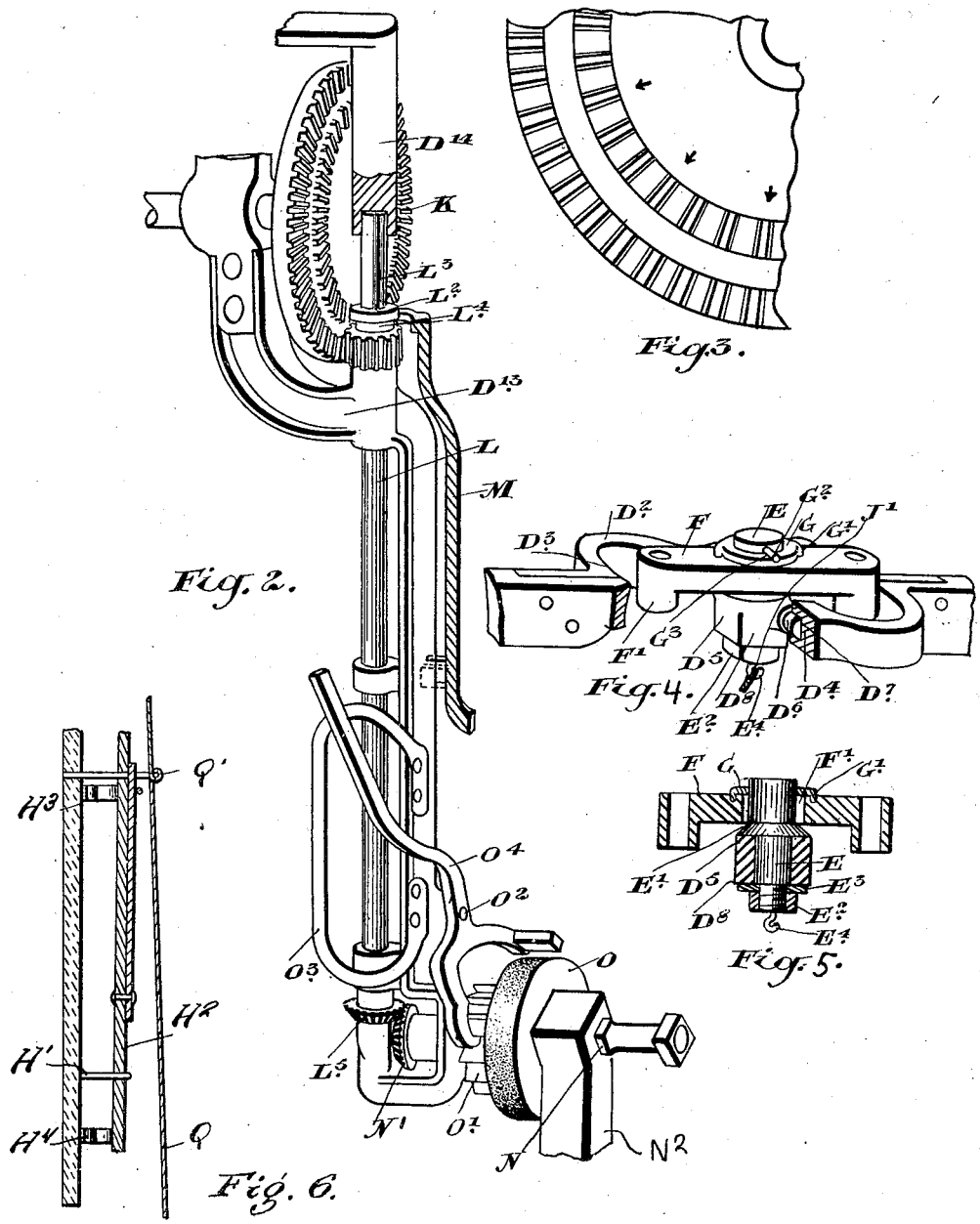

UNITED STATES PATENT OFFICE.

WILLIAM DICK BEATH, OF COLUMBUS, CANADA.

FEED AND LITTER CARRIER.

No. 827,842.  Specification of Letters Patent.  Patented Aug. 7, 1906.

Application filed July 1, 1905. Serial No. 267,991.

*To all whom it may concern:*

Be it known that I, WILLIAM DICK BEATH, farmer, residing at the village of Columbus, in the county of Ontario, in the Province of Ontario, Canada, have invented certain new and useful Improvements in Feed and Litter Carriers, of which the following is the specification.

My invention relates to improvements in feed and litter carriers; and the object of the invention is, first, to devise a form of litter-carrier specially adapted to carry heavy and light loads close to the track, if desired, and in which the box may be raised or lowered with facility whether it contains a light or heavy load; secondly, to provide means to connect the yokes together in such a manner that one may be set at any desired tilt in relation to the other so that the supporting-bracket will hang vertical to the track, and thus prevent their binding as they move along and at the same time to stiffen the bearings of the yokes so that the spindle will run true in its bearings within any determinate distance at which the yokes may be set apart; thirdly, to stiffen the hang of the car so that it may be readily pushed without swaying; fourthly, to provide an improved form of bail whereby the box may be raised close to the spindle and at the same time more room provided for loading and unloading, and, fifthly, to provide an improved form of combined brake and controlling device whereby the load is held securely from dropping during its elevation and controlled in speed in its descent. To carry out these objects, I have constructed and arranged my litter-carrier in the manner hereinafter more particularly explained.

Figure 1 is a perspective view of a litter-carrier constructed in accordance with my invention. Fig. 2 is an enlarged detail view of the down-hanger for supporting the elevating mechanism and controlling mechanism therefor. Fig. 3 is a further enlarged segmental detail of the main elevating-gear. Fig. 4 is an enlarged detail of the adjustable portion of the yoke. Fig. 5 is a longitudinal sectional view through the adjustable portion of the yoke shown in Fig. 4. Fig. 6 is a central longitudinal section through one end of the box shown in Fig. 1.

In the drawings like letters of reference indicate corresponding parts in each figure.

A is the track.

B B are the wheels of the carriage, the spindles B' B' of which are journaled in supporting-brackets C C, which have obliquely-set arms extending over pulleys below the tops thereof, so as to allow of the pulleys being placed as close together as possible and of the track being placed as close to the roof or ceiling of the barn as possible.

D and D' are the yokes, formed with a central divided enlargement $D^2$, suitably bolted together and forming an open frame having arc-shaped ends $D^3$ and central inwardly-extending projections $D^4$ $D^4$, formed at the side of the open enlargement $D^2$. Between the projections $D^4$ $D^4$ is swiveled the block $D^5$, the trunnions $D^6$ of which are journaled in the recesses $D^7$ of the projections $D^4$. The block is provided with a slight downward extension or enlargement $D^8$.

E is a bolt extending centrally through the block $D^5$ and provided with an annular shoulder E'. The bolt is secured in place by the nut and washer $E^2$ $E^3$, respectively.

F is a cross-arm to each end of which is secured one of the brackets C, supporting the pulleys B B. The arm F is provided with a central vertical slot F', through which extends the upper end of the bolt E. The arm F is designed to rest on the top of the enlargement E' of the bolt E.

G is a washer provided with downwardly-extending teats G', designed to extend into the cross-arm and hold it in place on the end of the bolt.

$G^2$ is a pin which extends through the bolt at right angles to the arm F.

$G^3$ represents recesses in the washer G, in which the pin $G^2$ is designed to rest.

The cross-arm F and its accompanying parts form a joint capable of allowing a rocking movement on a horizontal plane and a tilting movement on a longitudinal vertical plane. Thus the pulleys are enabled to adapt themselves to any direction the track may take, whether inclined or curved. By this connection also the car may be raised or lowered to suit the height of the roof from the ground. In the arrangement shown in the drawings it is adapted to suit a very low roof. By withdrawing the bolt E from the trunnion-block $D^5$ and turning the block over in its bearings and reinserting the bolt the connection is slightly lengthened by reason of the enlargement $D^8$, and is thereby adapted to a roof of greater height. If it is still further desired to lengthen the connection for a still higher roof, it may be done by withdrawing the pin G² from the bolt E, removing the washer G and arm F, and replacing the arm, so that the hub portions F' extend upwardly, also removing and connecting the brackets C to correspond with this arrangement.

H is the box, which is made of suitable material and into which the feed or litter is designed to be loaded.

H' represents trunnions secured to the end of the box and on which the said box is designed to tilt.

H² represent bars, preferably of spring metal, through which the trunnions H' extend.

H³ H⁴ represent plates against which the bar H² is designed to press in order to aid holding the box in a vertical position.

The tops of the bars H² are provided with inturned ends H⁵, in which are swiveled the pulley-blocks H⁶.

H⁷ represents arc-shaped slots formed in the upper ends of the bars H².

I is a bail pivoted at each end in the bar H² by bolts I' and held in any desired position by the bolts I², passing through the bail and the arc-shaped slots H⁷. By this construction the bail may be swung down to either side out of the way when the box is being loaded.

J is the operating-spindle, journaled in the depending portions D⁹ D¹⁰ of the yokes D D'.

E⁴ is a hook secured to the end of the bolt E and to which is secured a cord J', which passes down and around the pulley H⁶ and up to the operating-shaft, around which it is wound, the end being secured to the collar J², secured to the shaft J.

The above-mentioned arrangement of parts is of course the same at both ends of the device.

J³ is a sleeve supported on the operating-spindle J and inserted at each end in the annular recesses D¹¹ of the depending portions D⁹ of the yokes. The sleeve is held in position by set-screws D¹².

It has been found that when the load has been placed in the box H the yoke D' has a tendency to tilt sidewise and bind on the operating-spindle. To overcome this tendency, I adjust the yoke on the sleeve J³ by the set-screws D¹², thereby forming a stiff and rigid connection between the yokes D and D'. The yokes by this means may also be adjusted longitudinally to fit the box.

By loosening the set-screw D¹² the yoke may be tilted laterally so as to overcome any tendency for the box to swing crosswise of the track, as has been found to be the case in practice when the box is unevenly loaded.

The yoke D is provided with a depending main hanger D¹³.

K is the main operating gear-wheel, secured on the end of the spindle J and formed with a double set of gear-teeth, arranged as shown in Fig. 3, in which every fourth tooth of the outer set is located opposite a tooth of the inner set.

L is a vertical shaft journaled in bearings in the down-hanger D¹³ and is also held in the bracket D¹⁴ at the top.

L' is a gear-pinion slidably held on the shaft L by a suitable key and keyway L² and L³, respectively.

L⁴ is a grooved collar forming part of the pinion L'.

M is a vertical bar provided with a slotted side plate M', and M² is a bolt extending through the slot into the down-hanger D¹³. The upper end of the bar is provided with a suitable fork designed to enter the groove of the collar L⁴.

By this arrangement I am enabled to raise a heavy load by the use of the outer gear. When it is desired to raise a light load, it can be done with greater speed by moving the pinion L' vertically into mesh with the inner gear of the gear-wheel K. This may be done at the points marked by arrow in Fig. 3, where the teeth in the outer and inner sets of gear come opposite each other.

The lower end of the spindle L is provided with a bevel-gear L⁵.

N is a counter-spindle provided with a bevel-gear N', meshing with the gear L⁵ at one end and provided with an operating crank-arm N² at the opposite end.

O is a friction-drum, and O' a ratchet-wheel secured to the spindle N.

O⁴ is a forked lever pivoted on the pin O², one member of the fork acting as a dog for the ratchet-wheel O' and the other as a pressure-bar to coact with the drum O.

O³ is a handle secured to the down-hanger D¹³.

It will be seen by this construction that as the load is raised it may be held at any desired height and that when it has been brought to its destination it may be relieved and gradually lowered by merely a pressure of the thumb on the lever, the pressure-plate forming part of the lever pressing on the drum to obtain this result.

The yoke D' is also provided with a supplemental down-hanger P, provided with an adjustable bracket P', secured in position on the down-hanger by a set-screw P².

P³ is an eye secured to the side of the box H, and P⁴ is a hook pivoted between lugs P⁵ and designed to enter the eye P³. By this means as the box is being moved from place to place it is held perfectly steady. To dump the load, I provide a cord Q, connected to any suitable form of spring-catch, such as a pin Q', spring-held in a hole in the box. From the pin Q' the cord passes across the bail to a similar pin at the other side of the box. By withdrawing the pin after disconnecting the hook P⁴ from the eye P³ the box, being pivotally supported below its center, will rotate and eject the load onto the dump.

The use of the bail I is to form a pivot for the box, so that it may be dumped and after being dumped restored to its normal position again. It is much like bails of all receptacles or pails in this respect instead of course that it has a means for holding the box in the upright position, such means being released to allow of the box being dumped.

From this description it will be seen I have constructed a carrier adapted to handle both heavy and light loads and that will move easily on the track without binding and with an even movement.

What I claim as my invention is—

1. In a litter-carrier, the combination with the box, the track, yokes, pulleys on the yokes and engaging with the track, a spindle carried by the yokes, flexible means connecting the box with the spindle, a hanger connected to one yoke, means carried thereby for operating the spindle a supplemental hanger carried by the other yoke and detachable connecting means between said supplemental hanger and the box.

2. In a litter-carrier, the combination with the box, the yokes and pulleys, of a supplemental hanger depending from the yoke, and a vertically-adjustable connecting means between the hanger and the box as and for the purpose specified.

3. In a litter-carrier, the combination with the box, the yokes and pulleys, of a hanger depending from the yoke, a vertically-adjustable bracket connected to the hanger, and a hook-and-eye connection between the box and bracket, as and for the purpose specified.

4. In a litter-carrier, the combination with the main operating-spindle, the box depending therefrom, and the yokes, of the main hanger depending from one of the yokes, a vertical spindle journaled in bearings thereon, a face-gear secured to the end of the main operating-spindle having an inner and outer circle of gear-teeth and a gear-pinion slidably held on the vertical shaft, the teeth of the face-gear being so arranged that the pinion may be directly and radially slid from one circle of teeth to the other at points where the teeth are on the same radial line, a grooved collar secured to or forming part of the said pinion, a forked depending arm, designed to enter the groove and to be slidably connected to the hanger, and having a slot therein, and a bolt passing through the slot and the hanger designed to secure the hanger in any desired position, as and for the purpose specified.

5. In a litter-carrier, the combination with the yokes and the operating-spindle journaled in the same, and the box supported from the spindle, of a sleeve surrounding the spindle and connected at each end to the yokes as and for the purpose specified.

6. In a litter-carrier, the combination with the yokes and the operating-spindle journaled in the same, and the box supported from the spindle, of a sleeve surrounding the spindle and adjustably connected at each end to the yokes, as and for the purpose specified.

7. In a litter-carrier, the combination with the yokes, pulleys and cross-bars at each end of which the pulleys are connected, of a universal-joint connection between the arms and the yokes, as and for the purpose specified.

8. In a litter-carrier, the combination with the pulleys, the arm to which the pulleys are connected, the yokes having central openings, of a trunnion-block pivoted crosswise, of the opening and to which the cross-arm is centrally secured, as and for the purpose specified.

9. In a litter-carrier, the combination with the pulleys, and the yokes, of a slotted arm to which the pulleys are secured, a stud-bolt extending up from the yoke through the slot, a washer encircling the projecting end of the stud having teats extending into holes in the arm, and a cross-pin extending through the bolt and into grooves in the washer, as and for the purpose specified.

10. In a litter-carrier, the combination with the main operating-spindle, the box depending therefrom, and the yokes, of the main hanger depending from one of the yokes, a vertical spindle journaled in bearings thereon, a face-gear secured to the end of the main operating-spindle having an inner and outer circle of gear-teeth and a gear-pinion slidably held on the vertical shaft, the teeth of the face-gear being so arranged that the pinion may be directly and radially slid from one circle of teeth to the other at points where the teeth are on the same radial line, as and for the purpose specified.

WILLIAM DICK BEATH.

Witnesses:
JAMES MACKIE.
ROY KENNEDY